United States Patent [19]

Suman, Jr. et al.

[11] 3,750,768

[45] Aug. 7, 1973

[54] OIL BASE DRILLING FLUID FILTRATE-EFFECTED SAND CONSOLIDATION

[75] Inventors: George O. Suman, Jr., Edwin A. Richardson, both of Houston; Ronald F. Scheuerman, Bellaire, all of Tex.

[73] Assignee: Shell Oil Company, Houston, Tex.

[22] Filed: Jan. 27, 1972

[21] Appl. No.: 221,402

[52] U.S. Cl. ............... 175/72, 166/295, 252/8.5 M
[51] Int. Cl. ................. E21b 21/04, E21b 33/138
[58] Field of Search ............... 175/72, 65; 166/295; 252/8.5 M

[56] References Cited
UNITED STATES PATENTS

| | | |
|---|---|---|
| 2,223,027 | 11/1940 | Dawson et al. .................. 252/8.5 M |
| 2,350,154 | 5/1944 | Dawson et al. .................. 252/8.5 M |
| 2,356,302 | 8/1944 | Chapman ........................ 252/8.5 M |
| 3,294,166 | 12/1966 | Havenaar et al. ................ 166/295 |
| 3,294,168 | 12/1966 | Bezemer et al. ................. 166/295 |
| 3,308,884 | 3/1967 | Robichaux ...................... 166/295 |
| 3,339,633 | 9/1967 | Richardson ..................... 166/295 |
| 3,428,122 | 2/1969 | Methven et al. ................. 166/295 |

*Primary Examiner*—Stephen J. Novosad
*Attorney*—Harold L. Denkler and H. W. Coryell

[57] ABSTRACT

A permeable water-containing earth formation is consolidated while a borehole is being drilled into that formation by circulating as a drilling fluid an oil solvent solution containing a mixture of an epoxide and imine that forms an epoxy resin when mixed with water and a suspension of finely divided solid particles that forms a filter-cake permitting a selected amount of filtrate invasion into a permeable earth formation.

4 Claims, No Drawings

OIL BASE DRILLING FLUID FILTRATE-EFFECTED SAND CONSOLIDATION

BACKGROUND OF THE INVENTION

The invention relates to a process for drilling a borehole with an oil-based mud while consolidating a permeable water-containing earth formation into which the borehole is being drilled. The invention is particularly useful in drilling operations that are apt to encounter water-containing unconsolidated reservoir formations (which may also contain oil). In such situations, the invention improves the borehole stability, provides a consolidated reservoir formation to which cement can be more firmly bonded than it could to an unconsolidated earth formation and/or consolidates to a selected depth a virgin reservoir formation which has not been previously invaded by any fluids other than the natural reservoir fluids.

SUMMARY OF THE INVENTION

The invention relates to drilling a borehole into a permeable water-containing earth formation while consolidating particles within the earth formation to form a permeable integral structure. The borehole is drilled by circulating a drilling fluid comprising an oil solvent solution of a mixture of epoxide and imine that forms an epoxy resin when mixed with water and a suspension of finely divided solid particles that form a filter cake when screened out agains a permeable earth formation. The circulating drilling fluid is pressurized within the borehole to cause filtrate invasion of the earth formation and is maintained (i.e. is treated between recycles into the borehole) to provide a filtrate solution of resin forming components that precipitates a partially cured epoxy resin when those components react with the water within the earth formation.

DESCRIPTION OF THE INVENTION

The present invention is at least in part premised on a discovery that the drilling fluid filtrate invasion caused by the above drilling procedure adjusts the fluid content of a permeable water-containing earth formation to that required for forming and curing a sand consolidating resin. The water concentration of such an earth formation may range from substantially all water to only a residual or irreducible water saturation in a predominently oil-filled reservoir. When an oil-phase liquid, such as the presently described filtrate, flows through a peremable water-containing earth formation or reservoir, it tends to dissolve and miscibly displace substantially all oil-phase reservoir liquids that may be present while displacing some, and bypassing some, of the aqueous liquids. As known to those skilled in the art, such as oil-phase liquid displacement tends to reduce the water concentration of such a reservoir to a water-residual saturation. At such a residual saturation, the water is usually present in amounts in the order of from 15 to 25 percent of the pore volume. Where the viscosity (at reservoir temperature) of the oil-phase liquid that displaces reservoir fluids is substantially 1 centipoise, the displacement leaves a substantially irreducible proportion of water that tends to be adsorbed on the reservoir rocks as a wetting phase which is distributed all along the walls of the pores.

Those of the pores in a permeable water-containing reservoir which are located near enough to the borehole of a well being drilled in accordance with the present invention to be penetrated by a plurality of pore volumes of the drilling fluid filtrate, tend to be swept free of any natural oil they may have contained. Such pores are left filled with only the epoxide and imine-containing filtrate and residual water. In such pores the water reacts with the imine and hydrolyzes it to the amine and the amine combines with the epoxide to form an epoxy resin. The present invention utilizes a discovery that the readily attainable relative proportions of such reactants and reservoir fluids are such that it is feasible to conduct such a consolidation while drilling a borehole. When (1) the drilling fluid filtrate comprises a mixture of aliphatic and aromatic hydrocarbons containing a resin-precipitating proportion (such as about 18 percent by weight of the solution) of a mixture of the epoxide and imine in substantially stoichemetric proportions (i.e., about 10 parts by weight of imine per 100 parts by weight of epoxide) relative to resin-formation, and (2) enough filtrate flows through an earth formation pore to reduce the water content of the pore space to an amount in the order of 25 percent of the pore volume, the proportions of water and imine are about stoichemetric with respect to the hydrolysis of the imine. When the filtrate-composition is so adjusted, the epoxy resin is formed, precipitates, becomes adsorbed on the reservoir rock surfaces, and cures on those surfaces in a manner that consolidates any granular mass within the reservoir into a permeable integral structure. Those of the pore spaces within the reservoir which are located further away from the borehole are penetrated by less of the drilling fluid filtrate and, accordingly, the extent of the sand consolidation decreases with distance away from the well.

Oil solvent solutions of epoxy resin-forming components comprising solutions which are suitable for use as the drilling fluid filtrates of the present invention can contain a relatively wide variety of components and relative proportions. In general, such solutions are preferably formulated in accordance with the teachings of the Havenaar and Meys U.S. Pat. 3,294,166 which describes an epoxy resin-precipitating well treating process for consolidating sand. In the present process the curing agent is an amine in which the amino hydrogen atoms are covered (by reacting them with a ketone or aldehyde to form the imine). The resin-forming solution components and proportions described in the above patent (such as: an oil solvent comprising mixed liquid hydrocarbons containing at least 50 percent by volume aromatic hydrocarbons; a polyepoxide; a polyfunctional amine, in imine-form, curing agent; a polymerization accelerator; reactant proportions that provide polymerization at a selected rate at the earth formation temperature; bonding agents; and the like) are particularly suitable for use in the present invention, and are incorporated herein by reference.

The imine which is used as a latent curing agent in the present drilling fluid filtrate can be a ketimine or aldimine of substantially any amine which is suitable for use as a curing agent in an epoxy resin formulation. The ketimines are preferred. Illustrative examples of ketimines which can be prepared by a direct reaction of a ketone with an amine (by procedures known to those skilled in the art) are listed in Table 1.

TABLE 1

| Ketone* | Amine* | Boiling Point of Ketimine °C | mm Hg |
|---|---|---|---|
| DMK | EDA | 44–46 | 1.0 |

| | | | |
|---|---|---|---|
| DMK | DTA | 75 | 1.0 |
| MEK | PDA | 91–95 | 1.0 |
| MEK | DTA | 100–104 | 0.5 |
| MIBK | EDA | 91–92 | 1.0 |
| MIBK | HMDA | 140 | 0.4 |
| MIBK | MXDA | 180 | 1.0 |
| MIBK | DTA | 138 | 1.0 |
| MIBK | TEPA | 215–220 | 1.0 |
| DIBK | MXDA | 200 | 0.8 |
| MPK | EDA | 114–116 | Melting point |

(a) DMK = Acetone
MEK = Methyl ethyl ketone
MIBK = Methyl isobutyl ketone
DIBK = Diisobutyl ketone
MPK = Acetophenone (b) EDA = Ethylene diamine
DTA = Diethylenetriamine
PDA = Propylene diamine
HMDA = Hexamethylene diamine
MXDA = Methaxylylene diamine
TEPA = Tetraethylene pentamine The finely divided solid particles which are suspended in the present drilling fluid filtrates to form a filter cake can comprise substantially any filter cake-forming solid particles which are substantially completely immiscible and inert with respect to the oil solvent solution utilized as the filtrate. Such finely divided solids can comprise preyielded or prehydrated clays, such as a prehydrated bentonite, Fuller's earth, aluminum silicates, calcium carbonates, blown asphalts or the like, such as the materials described in patents such as U.S. Pat. Nos. 2,223,027 or 2,350,154.

The sand consolidating drilling fluid of the present invention can also contain substantially any of various additives for improving the drilling fluid properties as long as such additives are compatible with the components and reactivity of the sand consolidating filtrate and the controlled filter loss properties of the drilling fluid. Such additives can comprise: weighting materials, such as barites, iron or lead oxides, galena or the like; viscosity increasing agents or thickeners, such as the partially hydrolyzed polyacrylamides or the like; corrosion inhibitors; etc.

The drilling fluid maintenance that is employed while drilling in accordance with the present process should include the adjusting of the drilling fluid filtrate composition to the extent required to provide a filtrate solution of resin forming components which precipitates a partially cured epoxy resin it reacts with the water in a permeable water-containing earth formation. As known to those skilled in the art, the maintenance of an oil base drilling fluid should include adjustments of the fluid loss and/or viscosity imparting components as required to maintain the selected fluid loss and reological properties. Water that becomes entrained in the circulating drilling fluid is preferably removed by surface treatments such as settling, centrifuging, or the like. Particles of solidified epoxy resin which form within the circulating drilling fluid are preferably removed by screening and/or desanding or the like treatments. The concentration of the resin forming solvents and/or reactants are preferably adjusted as required to provide the resin precipitating capability of the filtrate.

As known to those skilled in the art, finely divided suspended solid materials such as filter cake-forming solids and/or bit cutting solids tend to form relatively low permeability filter cakes on the permeable portions of the wall of a borehole. This occurs when the circulating drilling fluid is pressurized (by means of its hydrostatic head and/or surface applied pump pressure) so that the liquid flows into the pores of a permeable earth formation while screening out the solids on the wall of the borehole. The filter cakes tend to become thickest and least permeable along the most permeable earth formations encountered by the borehole, since more fluid flows into them and causes more solids to be screened out against them. The thickening of the filter cake decreases the rate of filtrate invasion into the adjacent earth formation and, thus, the filter cake tends to normalize the extent of the filtrate invasion so that all portions of the formation are treated, since the more permeable portions do not receive proportionately larger amounts of filtrate.

The present process is particularly useful in drilling into an oil and water containing reservoir formation that is or is apt to become unconsolidated. In a preferred procedure, the borehole is drilled through the overlying earth formations and into a zone near such a reservoir formation by circulating one or more conventional types of aqueous and/or oil base drilling fluids. A sand consolidating oil-base mud of the present type is preferably formulated at or near the well location and the composition of the drilling fluid being circulated is adjusted when desired to provide a circulation of the sand consolidating oil-base drilling fluid of the present invention. The filtrate-effected sand consolidation provided by drilling through a permeable water-containing earth formation with the present drilling fluid can convert an unconsolidated interval, such as those comonly encountered near the Gulf of Mexico, from an interval which requires special completion or treatment procedures (such as gravel packs, subsequent well treatments to effect an in situ sand consolidation, or the like) to an interval that is comparable, in ease of well completion and maintenance, to a competent or well-cemented type of reservoir interval.

The present filtrate-effected sand consolidating drilling process is also useful where it is desirable to effect a sand consolidation throughout a relatively large portion of a permeable water-containing earth formation as soon as a borehole has been extended into at least the uppermost portion of that formation. For example, in numerous reservoirs near the Gulf of Mexico, the oil-bearing sands are apt to be unconsolidated relatively thin stringers sandwiched between substantially impermeable relatively thick layers or sections of shale. In such stringers of unconsolidated sands, the vertical as well as the horizontal permeabilities tend to be high. In addition, since the sands are unconsolidated, substantially any backflow or production of fluid from the to the borehole is apt to remove significant portions of sand and form cavities around the well. In accordance with the present invention, when the top of such a layer has been encountered, the borehole advancing is preferably interrupted (for example, by taking weight off the bit and simply rotating and/or reciprocating the drill string assembly) while circulating the drilling fluid. Such a procedure by itself tends to remove the filter cake or to increase its permeability near the bottom of the borehole. This increases the amount of filtrate invasion so that, where the filtrate is the present sand consolidating solution, it increases the depth of penetration below and around the borehole of the sand consolidating treatment. Where desirable the sand consolidating solution or drilling fluid filtrate can be injected by setting a downhole packer or increasing the annulus pressure and injecting a relatively large slug of the sand consolidating solution into the reservoir in order to ef-

What is claimed is:

1. A sand consolidating drilling process comprising:

drilling a borehole into a permeable water-containing earth formation while circulating an oil-base drilling fluid comprising an oil solvent solution that contains a dissolved mixture of epoxide and imine that forms an epoxy resin when mixed with water and suspended finely divided solid particles that form a filter cake when screened out against a permeable earth formation;

pressurizing the circulating drilling fluid within the borehole to cause a filtrate invasion into a permeable water-containing earth formation; and maintaining the chemical composition of the circulating drilling fluid so that its filtrate comprises a solution of resin-forming components that precipitates a partially cured epoxy resin when the filtrate is mixed with the water in a permeable water-containing earth formation.

2. A process of claim 1 in which the solvent components of said oil solvent solution comprise a mixture of aliphatic and aromatic hydrocarbons that predominates in aromatic hydrocarbons.

3. The process of claim 1 in which said oil-base drilling fluid is formulated near a drilling site and the composition of a drilling fluid being circulated while drilling a borehole is altered to provide said circulation of an oil-base drilling fluid.

4. The process of claim 1 in which:

said drilling into a permeable water-containing earth formation is interrupted while the borehole reaches an upper portion of an unconsolidated water-containing earth formation; and a slug of said oil-base drilling fluid having a volume sufficient to permeate a selected relatively extensive portion of said unconsolidated earth formation is injected into the earth formation.

* * * * *